G. M. IRWIN.
TOILET ARTICLE.
APPLICATION FILED AUG. 24, 1908.
920,147.
Patented May 4, 1909.
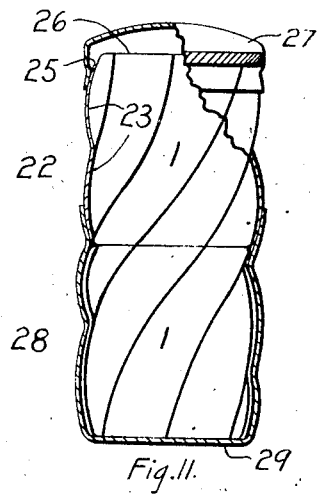
Fig. 11.
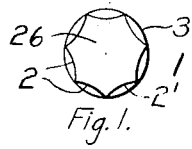
Fig. 1.
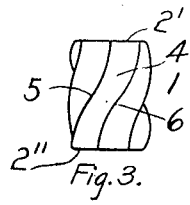
Fig. 3.
Fig. 2.
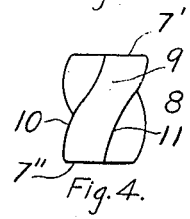
Fig. 4.
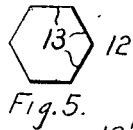
Fig. 5.
Fig. 6.
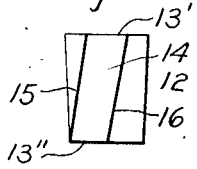
Fig. 7.
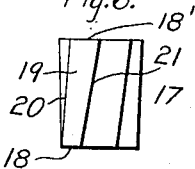
Fig. 8.
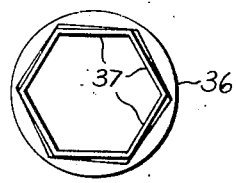
Fig. 12.
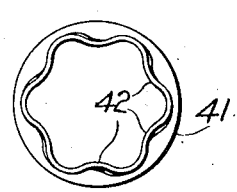
Fig. 9.
Fig. 10.
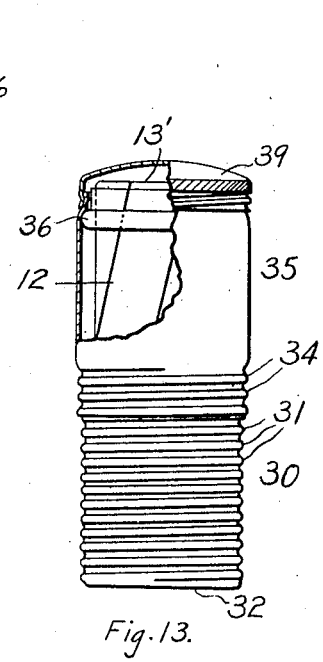
Fig. 13.
Witnesses:
Inventor
George M. Irwin.
By His Attorney

UNITED STATES PATENT OFFICE.

GEORGE M. IRWIN, OF EAST ORANGE, NEW JERSEY.

TOILET ARTICLE.

No. 920,147.      Specification of Letters Patent.      Patented May 4, 1909.

Application filed August 24, 1908. Serial No. 450,073.

*To all whom it may concern:*

Be it known that I, GEORGE M. IRWIN, a citizen of the United States, and a resident of East Orange, in the county of Essex and State of New Jersey, have invented certain new and useful Improvements in Toilet Articles.

This invention relates generally to a stick of abradable substance as an article of manufacture, for use in a combined, collapsible container and holder, having a constricted mouth of selected polygonal cross-section corresponding to the uniform cross-section of said stick.

More particularly the invention applies to prismatic sticks of shaving soap. In this application the meaning of the word polygonal should be defined broadly as non-circular, and describes figures, the direction of whose outlines varies irregularly. The outline of such a figure may comprise straight lines and curved lines. Likewise, the term prismatic is used to define a solid having a uniform polygonal cross-section, as defined above.

The object of the invention is to produce a stick of shaving soap, so formed as to coöperate with a combined container and holder having an open mouth of peculiar cross-section, and with such a container and holder only.

A further object of the invention is to produce such a stick of shaving soap as will coöperate with a combined container and holder comprising a hollow shell with a mouth of polygonal cross-section and a rotating pusher member having thread engagement with said shell and rotatably advancing to extrude the stick of shaving soap contained in said shell, the stick of shaving soap having prismatic form and its twist being moderate and in the direction to aid in the extrusion of the stick by screwing out through the polygonal mouth of the container due to the rotation of the pusher while at the same time it is being pushed out by the advance of the pusher.

It is also an object of the invention generally to improve the construction and adaptability of shaving sticks so as to coöperate with specially formed combined containers and holders.

These and other objects of the invention will be apparent from the following description and claims when read in connection with the accompanying drawings, in which like characters designate corresponding parts and in which—

Figure 1 is a top plan view of one embodiment of the invention; Fig. 2 is a top plan of a modified embodiment; Figs. 3 and 4 are side elevations respectively of the embodiments shown in Figs. 1 and 2; Fig. 5 is a top plan view of another modification; Fig. 6 is a top plan view of still another modification; Figs. 7 and 8 are side elevations respectively of the embodiments shown in Figs. 5 and 6; Fig. 9 is a plan view of a collar forming a restricted polygonal opening shown as a hexagon; Fig. 10 is a plan view of a modified collar providing a restricted polygonal opening shown as a regular fluted opening; Fig. 11 is a sectional elevation with parts broken away and partly an elevation showing the combined container and holder of a type to contain sticks of shaving soap like those shown in Figs. 1 to 8 inclusive; Fig. 12 is a top plan view of the top section of the container shown in Fig. 13 with the cap removed; and Fig. 13 is a side elevation of a modified combined container and holder with parts broken away to show the collar and the contained stick of shaving soap.

Referring now more in detail to the drawings, 1 and 2 designate respectively similar twisted prismatic sticks of shaving soap shown in detail in Figs. 1 and 3. Such a stick is uniform in cross-section throughout its length. In this modification the uniform cross-section is designated by the lines 2 in Fig. 1, the circle 3 merely indicating the outside appearance of the stick in plan view. This stick is best described as being a twisted prismatic stick, and the twisted contour is shown both in Figs. 3 and 13. For instance, the top edge of one of the twisted sides of this stick is designated by 2′, while 2″ denotes the corresponding bottom edge of the same twisted side, the two other bounding lines for this twisted surface 4 are designated by 5 and 6. The twisted arrangement results in a plurality of helically arranged surfaces 4 about the vertical sides of the stick. Obviously, if desired, the cross-section of such a prismatic stick may be varied so long as it remains polygonal as defined. For instance, in Figs. 2 and 4 there is shown a prismatic stick having a cross-section made up of four convex arcs 7, this stick being indicated by 8. Thus there is provided in this stick a plurality of helically arranged surfaces 9, bounded by the top arc 7' and the bottom arc 7'', and by the helical lines 10 and 11, the surfaces being exteriorly convex instead of concave as was the surface 4 in stick 1. Again, in Figs. 5 and 7 a twisted prismatic stick 12 is illustrated which is the uniform cross-section as designated by the lines 13. The helically arranged surfaces in this stick are illustrated by the surface 14, bounded by the top line 13', the bottom line 13'', and the inclined side lines 15 and 16. This stick has six vertical sides and the uniform hexagonal cross-section shown by the lines 13. However, if desired, a stick similar to 12 and illustrated by 17 is shown in Figs. 6 and 8, which has eight vertical sides and a uniform regular octagonal cross-section, as shown by the lines 18; one of the twisted side faces is indicated by 19 and is bounded by the top line 18', the bottom line 18'', and the inclined side lines 20 and 21.

One type of container and holder suitable for the sticks shown in Figs. 1 to 8 is shown in detail in Figs. 11 and 12 and is specially designed for the stick 1. In this modification a top shell 22 corresponds in lateral contour almost exactly with the lateral contour of the stick 1, having a twisted prismatic form and providing interior twisted surfaces 23, which coöperate with the corresponding and mated twisted surfaces 4 of the containing stick 1. It may be desired slightly to constrict the mouth 25 of the shell 1 to insure a particularly tight joint at this locality with the stick 1, the end 26 of which is to be extruded through the mouth 25. The removable cap 27 may be provided to fit over the shell 1, as shown, to protect the projecting end 26 of the stick 1. The bottom shell 28 telescopically engages about the top shell 22 and has a precisely similar twisted prismatic contour of a slightly larger size sufficient to fit over the shell 22. The bottom shell 28 may likewise contain a stick 1 or an extension of the top stick 1, or a suitable pusher. In its operation, the bottom shell 28 is rotated in a right hand direction so that the bottom closure 29 imparts a tendency to rotate to the contacting contained stick 1, at the same time it pushes the same upward, extruding the end 26 through the mouth 25.

In Fig. 13 a modified combined container and holder is illustrated which comprises a bottom hollow shell 30, provided with external screw threads 31 of a gentle pitch, and also provided with a bottom closure 32. The shell 30 is of a sufficient diameter to contain the cross-section of the stick 12 and is telescopically threaded into the threads 34 of top shell 35. Suitably secured within the mouth of the top shell 35 is a collar 36 forming a restricted polygonal mouth shown as a hexagon 37. Through this mouth 37 the end 13' of the stick is extruded and the collar 36 insures a tight fit about the stick 12, which is shown of right prismatic form with uniform polygonal cross-section. If desired, a cap 39 may be screw-threaded upon the shell 35 over the projecting end 13' of the stick. The collar 36 is shown in plan in Fig. 9 and it is to be understood, of course, that any other collar of suitable polygonal cross section may be substituted therefor. A collar having a throat of a cross section suitable for substitution is shown in Fig. 10 and indicated by 41. In fact any collar of a polygonal cross section and twisted sufficiently to fit any of the sticks of soap illustrated, might be employed in place of the collar 36.

For the purposes of description the bottom closure 32 or the bottom closure 29 either in the embodiment illustrated or in any suitable embodiment, are termed rotating pushers. The bottom closure 32 of shell 30 engaging directly against the bottom surface of the stick contained therein imparts a decided tendency to rotate to the contained stick, and when the contained stick is twisted it has been found that it feeds much more readily through a collar such as will correspond to the cross-section of the stick, than it will if it is of right prismatic form. To be sure, the bottom closure 32 exerts an upward pressure upon the contained stick, but in turning it exerts both the upward pressure and a tendency to rotate. By providing a twisted prismatic stick of properly proportioned twist and with the twist in a direction to correspond with the rotation of the rotating pusher an extremely efficient extruding of the stick may be accomplished.

Although there have been illustrated and described several embodiments of the invention, it is to be understood that these are for purposes of illustration merely, and that all embodiments are contemplated. It should also be understood that the invention is not directed to the ornamental design of a stick, but to a twisted prismatic stick which itself, as an article of manufacture, has a mechanical use and function and which will coöperate to effect its own ready extrusion with a specially designed container and holder, one form of which container and holder is also described and claimed in my co-pending application, Serial No. 450,072, filed Aug. 24, 1908.

What is claimed and what is desired to be secured by United States Letters Patent is:—

1. As an article of manufacture a stick of soap for use in a combined container and holder of the type having a hollow shell with a mouth of polygonal cross-section and a rotating pushing member threaded into said shell, said stick of soap having twisted prismatic form and a polygonal cross-section, its twist being moderate and in the direction to coöperate in the extrusion of said stick through said polygonal mouth of the shell upon the operation of said rotating pusher.

2. As an article of manufacture a stick of shaving soap for use in a combined container and holder comprising two telescoping hollow shells threaded together so as to collapse upon relative rotation, the bottom shell having a cross-closure, said stick having twisted prismatic form, the twist being moderate and in the direction to coöperate in the extrusion of said stick through a polygonal mouth of said holder corresponding to the uniform polygonal cross-section of said stick.

In witness whereof, I have signed my name to this specification, in the presence of two subscribing witnesses.

GEORGE M. IRWIN.

Witnesses:
GEORGE A. VOSS,
M. T. O'BRIEN.